United States Patent
Balakrishnan et al.

(10) Patent No.: US 10,162,986 B2
(45) Date of Patent: Dec. 25, 2018

(54) TECHNIQUES OF IMPROVING KVM SECURITY UNDER KVM SHARING

(71) Applicant: American Megatrends, Inc., Norcross, GA (US)

(72) Inventors: Venkatesan Balakrishnan, Chennai (IN); Jothiram Selvam, Paderborn (DE)

(73) Assignee: AMERICAN MEGATRENDS, INC., Norcross, GA (US)

( * ) Notice: Subject to any disclaimer, the term of this patent is extended or adjusted under 35 U.S.C. 154(b) by 213 days.

(21) Appl. No.: 15/239,054

(22) Filed: Aug. 17, 2016

(65) Prior Publication Data

US 2018/0053019 A1 Feb. 22, 2018

(51) Int. Cl.
*G06F 21/85* (2013.01)
*G06F 13/10* (2006.01)
*G06F 3/038* (2013.01)

(52) U.S. Cl.
CPC .............. *G06F 21/85* (2013.01); *G06F 3/038* (2013.01); *G06F 13/102* (2013.01)

(58) Field of Classification Search
CPC ......... G06F 21/85; G06F 3/038; G06F 13/102
See application file for complete search history.

(56) References Cited

U.S. PATENT DOCUMENTS

| 5,214,421 A * | 5/1993 | Vernon | G06F 3/023 235/146 |
| 6,671,756 B1 * | 12/2003 | Thomas | G06F 3/023 710/220 |
| 2002/0091850 A1 * | 7/2002 | Perholtz | H04M 11/045 709/231 |
| 2010/0306424 A1 * | 12/2010 | Akester | G06F 3/023 710/36 |
| 2011/0134027 A1 * | 6/2011 | Tsao | G06F 3/038 345/156 |
| 2011/0145451 A1 * | 6/2011 | Soffer | G06F 3/023 710/64 |
| 2014/0059257 A1 * | 2/2014 | del Toro | G06F 3/023 710/72 |

* cited by examiner

*Primary Examiner* — Harunur Rashid
(74) *Attorney, Agent, or Firm* — Locke Lord LLP; Tim Tingkang Xia, Esq.

(57) ABSTRACT

In an aspect of the disclosure, a method, a computer-readable medium, and an apparatus are provided. The apparatus may be a service processor. The service processor receives a KVM console flow from a host. The service processor redirects the KVM console flow to a first destination console. The service processor redirects a video stream, without a keyboard stream and a mouse stream, of the KVM console flow to a second destination console. The service processor detects that the first destination console is disconnected from the service processor. The service processor invokes a privilege-checking event at the host.

9 Claims, 4 Drawing Sheets

TECHNIQUES OF IMPROVING KVM SECURITY UNDER KVM SHARING

BACKGROUND

Field

The present disclosure relates generally to embedded-system devices, and more particularly, to techniques of improving keyboard, video and mouse console (KVM) flow security when a KVM console flow from a host is shared between two destination consoles.

Background

Considerable developments have been made in the arena of server management. An industry standard called Intelligent Platform Management Interface (IPMI), described in, e.g., "IPMI: Intelligent Platform Management Interface Specification, Second Generation," v. 2.0, Feb. 12, 2004, defines a protocol, requirements and guidelines for implementing a management solution for server-class computer systems. The features provided by the IPMI standard include power management, system event logging, environmental health monitoring using various sensors, watchdog timers, field replaceable unit information, in-band and out of band access to the management controller, simple network management protocol (SNMP) traps, etc.

A component that is normally included in a server-class computer to implement the IPMI standard is known as a Baseboard Management Controller (BMC). A BMC is a specialized microcontroller embedded on the motherboard of the computer, which manages the interface between the system management software and the platform hardware. The BMC generally provides the "intelligence" in the IPMI architecture.

A BMC may require a firmware image to make them operational. "Firmware" is software that is stored in a read-only memory (ROM) (which may be reprogrammable), such as a ROM, programmable read-only memory (PROM), erasable programmable read-only memory (EPROM), electrically erasable programmable read-only memory (EEPROM), etc.

A BMC may be considered as an embedded-system device or a service processor. A service processor may provide various functionalities for managing or serving a host. For example, a service processor may provide a rich set of KVM features. Thus, there is a need to improve security of the system.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a service processor. The service processor receives a KVM console flow from a host. The service processor redirects the KVM console flow to a first destination console. The service processor redirects a video stream, without a keyboard stream and a mouse stream, of the KVM console flow to a second destination console. The service processor detects that the first destination console is disconnected from the service processor. The service processor invokes a privilege-checking event at the host.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

A service processor may provide rich a set of KVM features including KVM sharing. Using KVM sharing, a master session holder (e.g., at a first destination console) can share the same screen display with a slave or secondary viewer (e.g., at a second destination console). But the keyboard and mouse control will not be shared with the secondary viewer. When the master session holder disconnects and the secondary session holder remains connected, the keyboard and mouse control may be then granted to the secondary session holder. In certain circumstances, the master session holder may have an administrator's access to the host system and may have logged into the host as an administrator. The secondary viewer is connected and viewing the screen display, but has no control over keyboard and mouse. The secondary session holder may not have an administrator privilege. Now due to network issues, power issues, or any other issue, the master session holder connection disconnects, and the secondary viewer may now obtain full control of the host. Thus, there is a need to improve security of the system.

Figure 1:
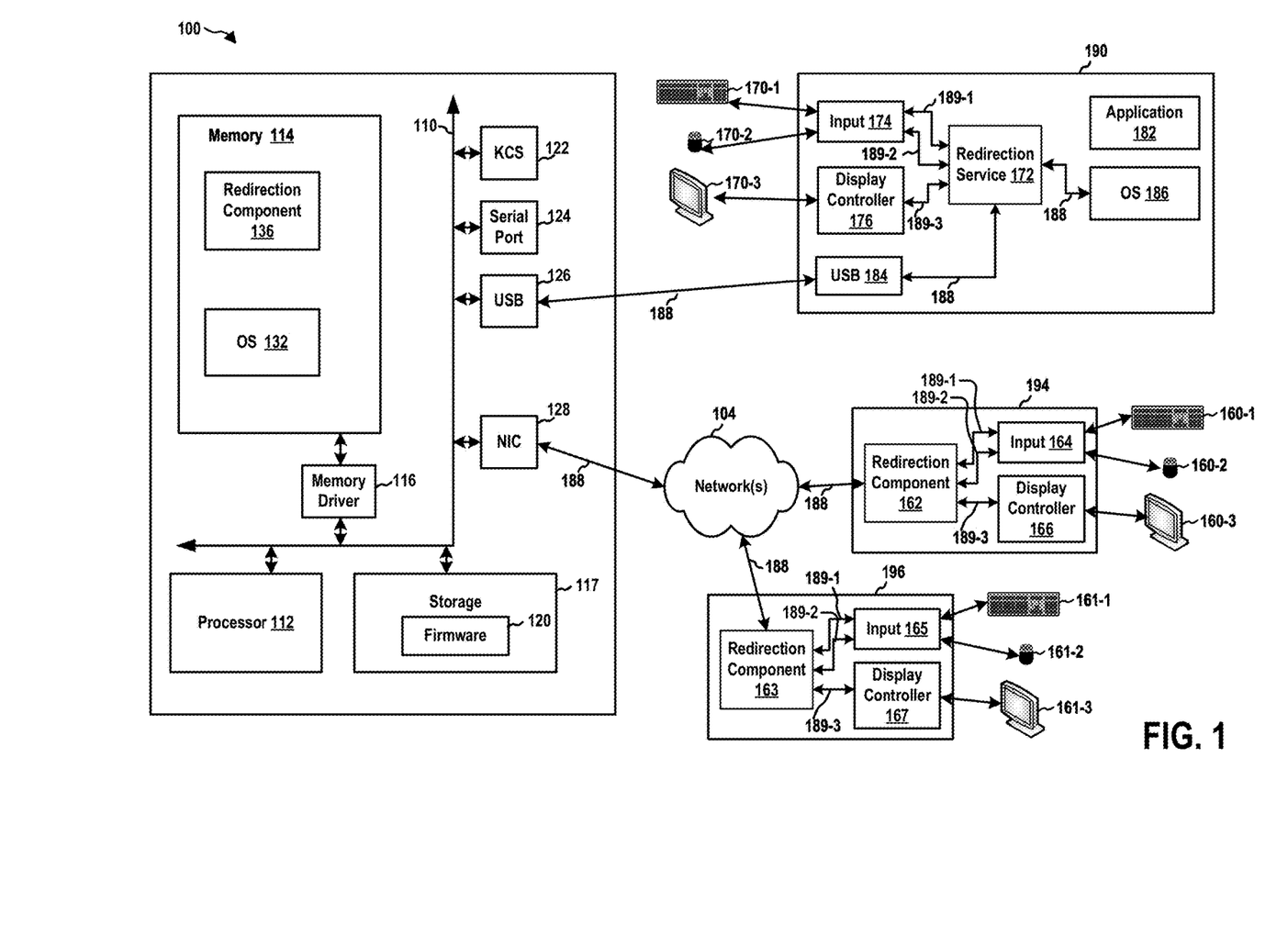
FIG. 1 is a diagram illustrating an embedded-system device.

FIG. 1 is a diagram 100 illustrating a service processor (SP) 102. The service processor 102 has, among other components, a processing unit 112, a memory 114, a memory driver 116, a storage 117, a keyboard controller style (KCS) interface 122, a serial port 124, a USB connection component 126, and a network interface card 128. Further, the service processor 102 may support IPMI and may provide an IPMI interface. The IPMI interface may be implemented over communication interfaces such as the KCS interface 122, the serial port 124, the USB connection component 126, the network interface card 128, etc. The memory 114, the processing unit 112, the memory driver 116, the storage 117, the KCS interface 122, the serial port 124, the USB connection component 126, the network interface card 128, etc., may be in communication with each other through a communication channel 110 such as a bus architecture. The service processor 102 may be in communication with, e.g., through communication interfaces or the IPMI interface, a host computer 190 and/or network devices 194, 196. The communication between the BMC and the network devices 194, 196 may be carried over a network 104. The BMC may manage the host computer 190. The host computer 190 has a USB connection component 184.

The storage 117 of the service processor 102 may store system firmware 120. When the processing unit 112 executes the system firmware 120, the processing unit 112 loads code and data of the system firmware 120 into the memory 114. This example shows that the system firmware 120 provides in the memory 114, among other components, an OS 132 and an SP redirection component 136.

The host computer 190 may include, among other components, a host OS 186, a user application 182, a redirection service 172, an input component 174, a display controller 176, and a USB connection component 184. The host OS 186 generates a KVM console flow 188 and sends the KVM console flow 188 to a host console 170. For example, the host console 170 may include a keyboard 170-1, a pointing device 170-2, and a display 170-3. The KVM console flow 188 may be bi-directional, thus providing bi-directional communication between the host OS 186 and the host console 170. The KVM console flow 188 may include a keyboard stream 189-1, a mouse stream 189-2, and a video stream 189-3.

More specifically, the host OS 186 sends keyboard data to the input component 174 through the keyboard stream 189-1 and sends pointing device data to the input component 174 through the mouse stream 189-2. The input component 174 generates keyboard signals in accordance with the keyboard data and transmits the keyboard signals to the keyboard 170-1. The input component 174 generates pointing device signals in accordance with the pointing device data and transmits the pointing device signals to the pointing device 170-2. Further, the keyboard 170-1 and the pointing device 170-2 may transmit keyboard signals and pointing device signals to the input component 174, respectively. The input component 174 generates keyboard data and pointing device data accordingly and sends the data to the host OS 186. Further, the host OS 186 sends video data to the display controller 176 through the video stream 189-3. The display controller 176 generates video signals in accordance with the video data and transmits the video signals to the display 170-3. The display 170-3 displays one or more screen displays in accordance with the video signals.

In certain configurations, the host computer 190 also includes a redirection service 172. The redirection service 172 may intercept or otherwise receive the KVM console flow 188 destined to the host console 170 and sent from the host OS 186. The redirection service 172 may redirect the KVM console flow 188 to other destination consoles in addition to the host console 170. Alternatively, the redirection service 172 may choose not to allow the KVM console flow 188 to be sent to the host console 170; as such, the KVM console flow 188 is only directed to the other destination consoles.

In this example, the redirection service 172 directs the KVM console flow 188 to the SP redirection component 136 of the service processor 102. The redirection service 172 and the SP redirection component 136 may utilize the USB connection component 184 and the USB connection component 126 for the redirection communication. Further, the SP redirection component 136 is configured to redirect, through the network interface card 128 and over the network 104, the entire KVM console flow 188 to a device redirection component 162 of the network device 194 (as a master session holder) and only the video stream 189-3 to a device redirection component 163 of the network device 196 (as a secondary session holder or a secondary viewer).

The network device 194 further includes, among other components, an input component 164 and a display controller 166. The input component 164 may communicate keyboard signals and pointing device signals with a keyboard 160-1 and a pointing device 160-2. The display controller

166 may communicate video signals with a display 160-3. The keyboard 160-1, the pointing device 160-2, and the display 160-3 collectively may be considered as a client console 160. The device redirection component 162 directs the keyboard stream 189-1 and the mouse stream 189-2 to the input component 164, which in turn redirects the keyboard stream 189-1 and the mouse stream 189-2 to the keyboard 160-1 and the pointing device 160-2, respectively. The device redirection component 162 directs the video stream 189-3 to the display controller 166, which in turn redirects the video stream 189-3 to the display 160-3.

The network device 196 further includes, among other components, an input component 165 and a display controller 167. The input component 165 may communicate keyboard signals and pointing device signals with a keyboard 161-1 and a pointing device 161-2. The display controller 167 may communicate video signals with a display 161-3. The keyboard 161-1, the pointing device 161-2, and the display 161-3 collectively may be considered as a client console 161. In this example, the device redirection component 163 currently only receives, from the SP redirection component 136, the video stream 189-3 without the keyboard stream 189-1 or the mouse stream 189-2. The device redirection component 163 directs the video stream 189-3 to the display controller 166, which in turn redirects the video stream 189-3 to the display 160-3.

The network device 194 may receive, through the client console 160, user input including user credentials. The user input is sent to the host OS 186 through the device redirection component 162, the SP redirection component 136, and the redirection service 172. Based on the user credentials, the host OS 186 can set up a user session. For example, the user credentials may indicate that the user have administrator's rights and privileges. The host OS 186 sets up a session granting the administrator's rights and privileges accordingly. As such, the user at the network device 194 may use to the client console 160 to instruct the host OS 186 to perform administrator tasks and view the screen displays as if the user is at the local console such as the host console 170. For example, the user application 182 may be an administrator's tool. As such, the network device 194 (e.g., under instructions of an administrator) may operate the user application 182. The display 160-3 of the client console 160 may receive the video stream 189-3 and display the screen displays of operating the user application 182.

On the other hand, as described supra, the display 161-3 of the client console 161 receives the same video stream 189-3 as received by the display 160-3. As such, the network device 196, even without being associated with administrator's rights and privileges, may receive and display screen displays of the network device 194 performing administrator tasks (e.g., operating the user application 182).

In certain circumstances, the SP redirection component 136 may detect that the redirection connection with the network device 194 has been disrupted (or disconnected). In other words, the KVM console flow 188 is no longer being redirected to the client console 160. In a first configuration, upon detecting the disruption, the SP redirection component 136 may start redirecting all streams of the KVM console flow 188 to the network device 196. As such, in addition to the video stream 189-3, the keyboard stream 189-1 and the mouse stream 189-2 are now also directed to the input component 165. Therefore, as the current session of the host OS 186 now accessible by the client console 161 may have been established with administrator's credentials, a user operates the client console 161 may perform administrator tasks at the host OS 186, even if the user may not be assigned administrator rights and privileges.

In a second configuration, upon detecting the disruption, the SP redirection component 136 may request the host OS 186 to perform a privilege-checking event. In particular, the SP redirection component 136 may emulate particular input (e.g., a keystroke combination "CONTROL+ALT+DELETE") and may send the emulated input to the redirection service 172 through the keyboard stream 189-1 and/or the mouse stream 189-2. The redirection service 172 further sends the particular input to the host OS 186. Upon receiving the particular input, the host OS 186 accordingly perform a privilege-checking event. For example, the host OS 186 may lock the session established with the network device 194 and the network device 196, and may present a login screen display requesting a user accessing the session to re-enter the user's credentials. Subsequently, the SP redirection component 136 may start redirecting all streams of the KVM console flow 188 to the network device 196. As such, in addition the video stream 189-3, the keyboard stream 189-1 and the mouse stream 189-2 are now also redirected to the input component 165. Nevertheless, the video stream 189-3 are now transmitting the screen display of the session at the host OS 186 performing the privilege-checking event. In this example, the client console 161 may accordingly displays a login screen display. A user at the client console 161 may use the keyboard 161-1 and/or the pointing device 161-2 to enter the user's credentials. The input at the client console 161 (containing the credentials) are redirected, through the SP redirection component 136 and the redirection service 172, to the host OS 186. The host OS 186 may accordingly adjust the rights and privileges granted to the session accessed by the network device 196. For example, if the credentials input through the client console 161 are for a standard user, not for an administrator, the host OS 186 may revoke the administrator's rights and privileges granted to the session accessed by the network device 196, and may assign a standard user's rights and privileges to the session. As such, the network device 196 is not allowed to access the user application 182 (e.g., an administrator's tool).

In a third configuration, upon detecting the disruption, the SP redirection component 136 may determine whether the user at the network device 196 (e.g., the secondary session holder or the secondary viewer) has the same rights and privileges as those of the user at the network device 194. When the user at the network device 196 has the same rights and privileges, the SP redirection component 136 may then start redirecting all streams of the KVM console flow 188 to the network device 196. When the user at the network device 196 does not have the same rights and privileges, the SP redirection component 136 may request the host OS 186 to perform a privilege-checking event as described supra with respect to the second configuration.

Figure 2:
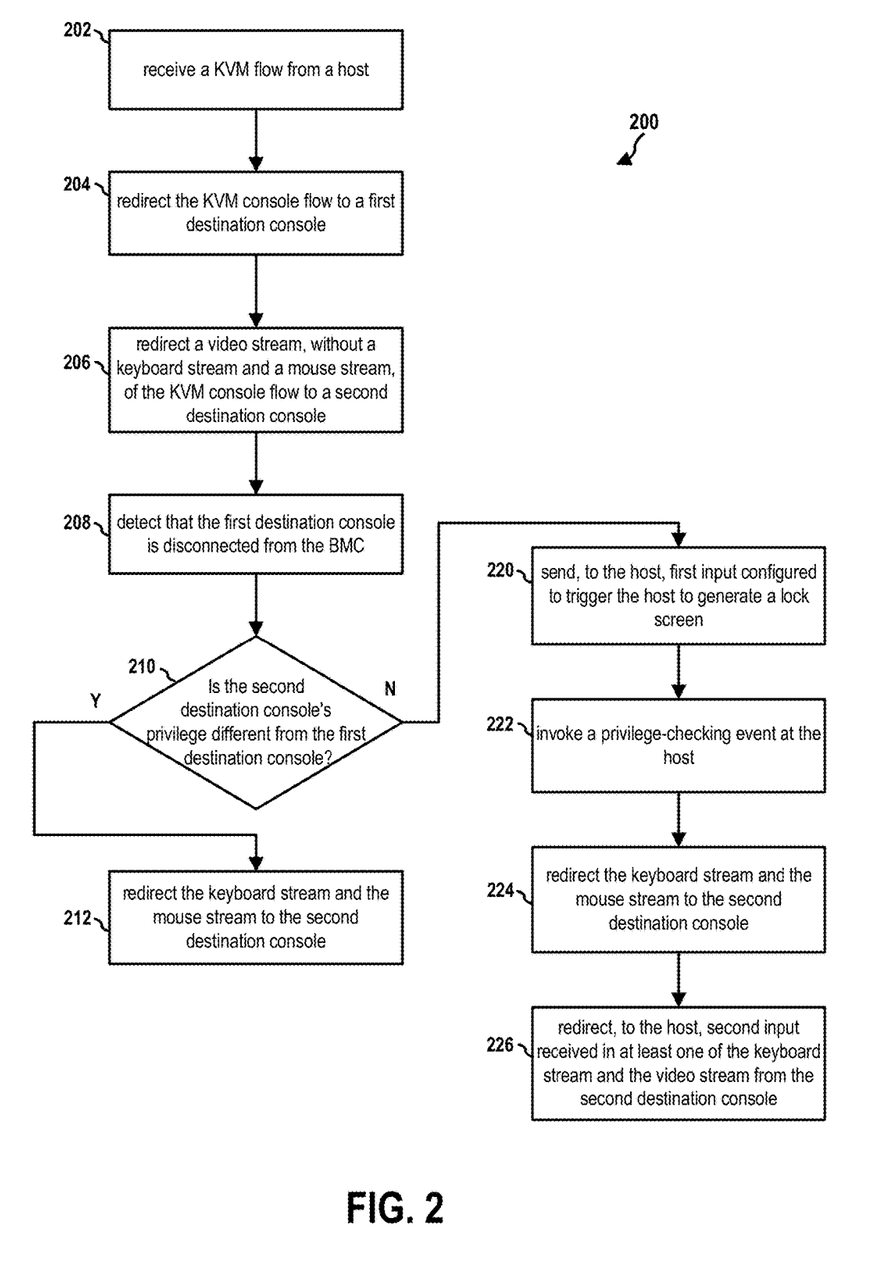
FIG. 2 is a flow chart of a method (process) for redirecting a KVM console flow.

FIG. 2 is a flow chart 200 of a method (process) for redirecting a KVM console flow. The method may be performed by an embedded-system device (e.g., the service processor 102 and the apparatus 102'). At operation 202, the embedded-system device (e.g., via the SP redirection component 136) receive a KVM console flow (e.g., the KVM console flow 188) from a host (e.g., the host computer 190). At operation 204, the embedded-system device redirects the KVM console flow to a first destination console (e.g., the network device 194, the device redirection component 162, or the client console 160). At operation 206, the embedded-system device redirects a video stream (e.g., the video stream 189-3), without a keyboard stream (e.g., the keyboard stream 189-1) and a mouse stream (e.g., the mouse stream 189-2), of the KVM console flow to a second destination console (e.g., the network device 196, the device redirection component 163, or the client console 161). In certain configurations, the video stream is destined to a display controller (e.g., the display controller 176 or the display 170-3), the keyboard stream is destined to a keyboard (e.g., the keyboard 170-1), and the mouse stream is destined to a pointing device (e.g., pointing device 170-2). At operation 208, the embedded-system device detects that the first destination console is disconnected from the embedded-system device. At operation 210, the embedded-system device determines whether the second destination console is associated with a user privilege different from a user privilege associated with the first destination console.

When the user privilege associated with the second destination console is the same as the user privilege associated with the first destination console, the embedded-system device, at operation 212, redirect the keyboard stream and the mouse stream to the second destination console.

When the user privilege associated with the second destination console is different from the user privilege associated with the first destination console, the embedded-system device, at operation 220, sends, to the host, first input configured to trigger the host to generate a lock screen. At operation 222, the embedded-system device invokes a privilege-checking event at the host. At operation 224, the embedded-system device redirects the keyboard stream and the mouse stream to the second destination console. At operation 226, the embedded-system device redirects, to the host, second input received in at least one of the keyboard stream and the video stream from the second destination console. The second input contains credentials indicate the user privilege associated with the second destination console.

Figure 3:
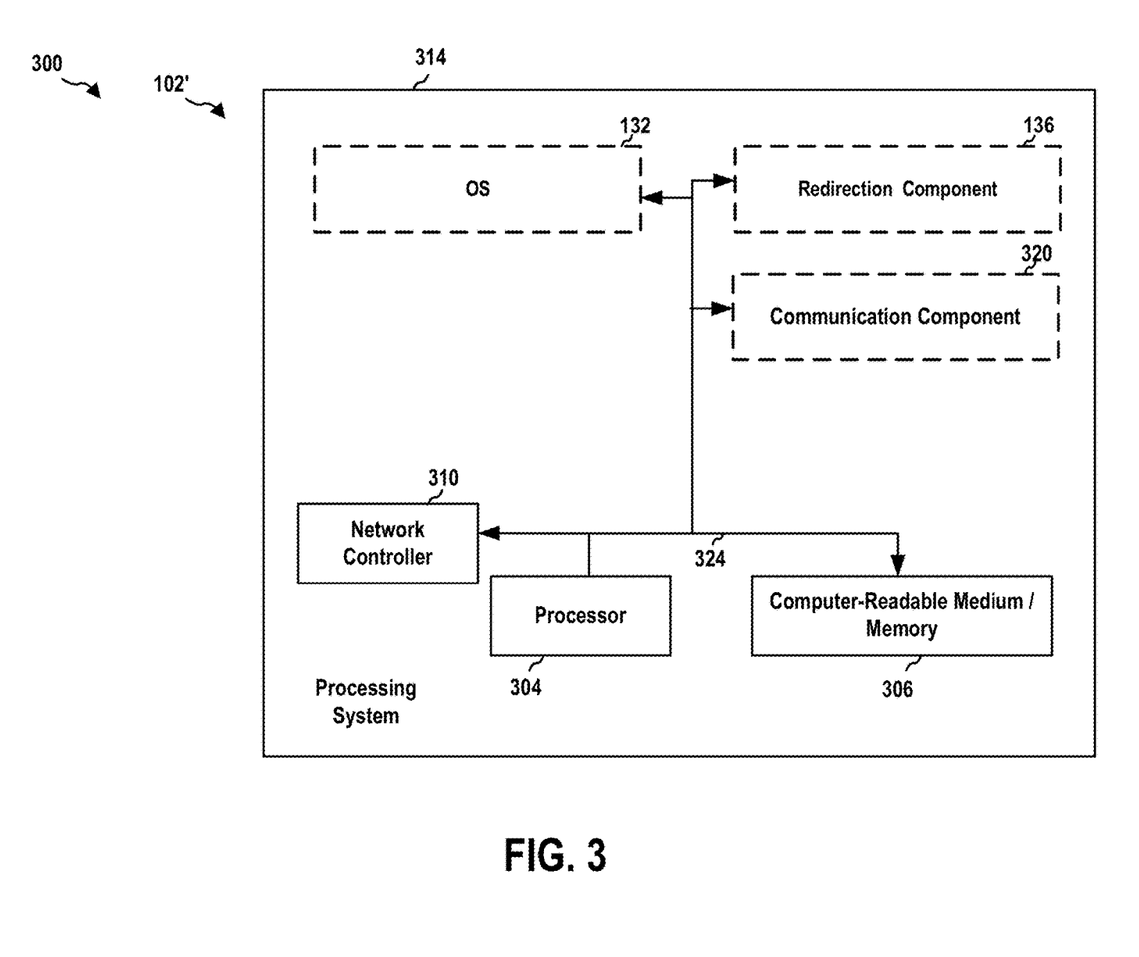
FIG. 3 is a diagram illustrating an example of a hardware implementation for an apparatus employing a processing system.

FIG. 3 is a diagram 300 illustrating an example of a hardware implementation for an apparatus 102' employing a processing system 314. The apparatus 102' may implement the service processor 102. The processing system 314 may be implemented with a bus architecture, represented generally by the bus 324. The bus 324 may include any number of interconnecting buses and bridges depending on the specific application of the processing system 314 and the overall design constraints. The bus 324 links together various circuits including one or more processors and/or hardware components, represented by the processor 304, the OS 132, the SP redirection component 136, and the computer-readable medium/memory 306. In particular, the computer-readable medium/memory 306 may include the memory 114 and the storage 117. The bus 324 may also link various other circuits such as timing sources, peripherals, voltage regulators, and power management circuits, which are well known in the art, and therefore, will not be described any further.

The processing system 314 may be coupled to a network controller 310. The network controller 310 provides a means for communicating with various other apparatus over a network. The network controller 310 receives a signal from the network, extracts information from the received signal, and provides the extracted information to the processing system 314, specifically a communication component 320 of the apparatus 102'. In addition, the network controller 310 receives information from the processing system 314, specifically the communication component 320, and based on the received information, generates a signal to be sent to the network. The processing system 314 includes a processor 304 coupled to a computer-readable medium/memory 306. The processor 304 is responsible for general processing, including the execution of software stored on the computer-readable medium/memory 306. The software, when executed by the processor 304, causes the processing system 314 to perform the various functions described supra for any particular apparatus. The computer-readable medium/memory 306 may also be used for storing data that is manipulated by the processor 304 when executing software. The processing system further includes at least one of the OS 132, the SP redirection component 136. The components may be software components running in the processor 304, resident/stored in the computer readable medium/memory 306, one or more hardware components coupled to the processor 304, or some combination thereof.

The apparatus 102' may be configured to include means for performing each of the operations described supra referring to FIG. 2. The aforementioned means may be one or more of the aforementioned components of the apparatus 102' and/or the processing system 314 of the apparatus 102' configured to perform the functions recited by the aforementioned means.

Figure 4:
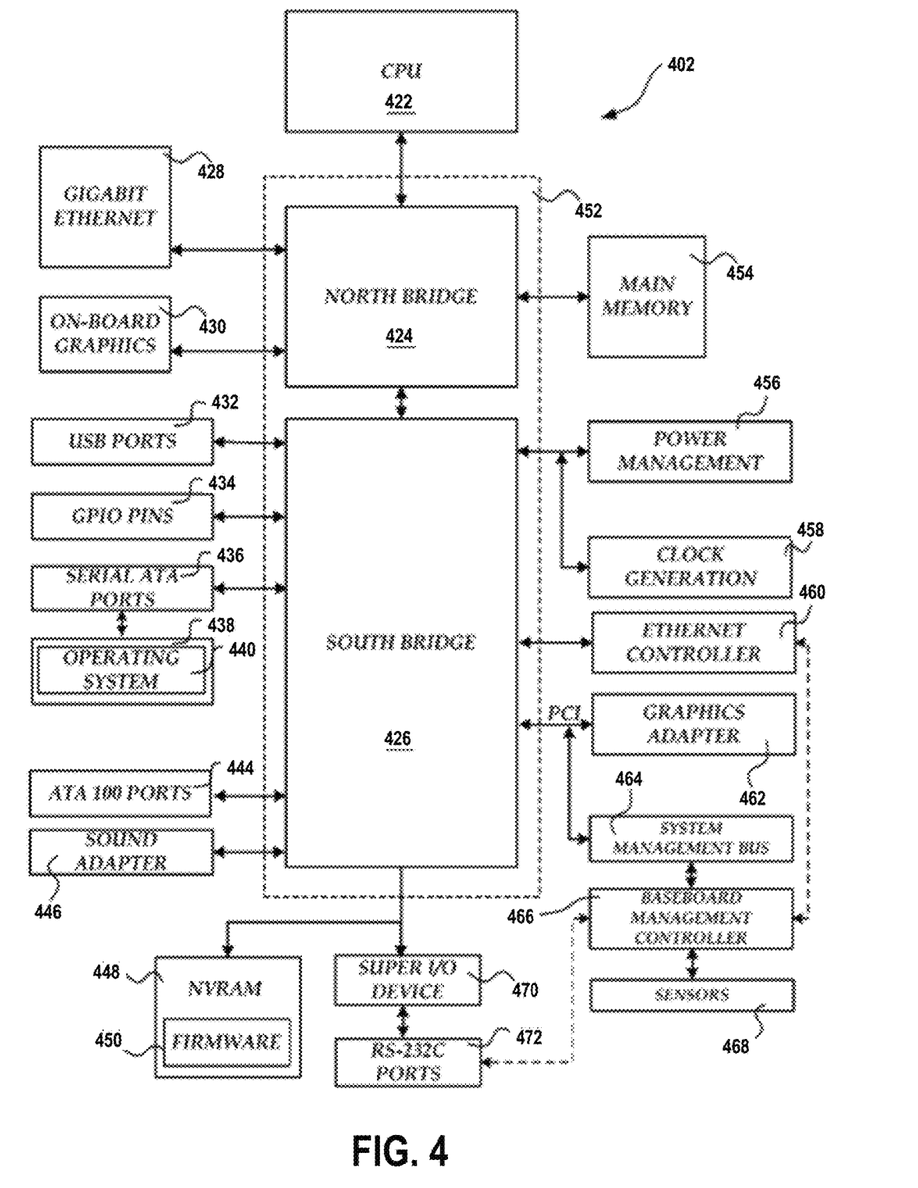
FIG. 4 shows a computer architecture for a computer.

FIG. 4 and the following discussion are intended to provide a brief, general description of one suitable computing environment in which aspects of the embodiments described herein may be implemented. In particular, FIG. 4 shows a computer architecture for a computer 402 that may be utilized to embody the host computer 190, as described supra. It should be appreciated that the computer architecture shown in FIG. 4 is merely illustrative and that other types of computers and computing devices may also be utilized to implement aspects of the embodiments presented herein.

While aspects presented herein include computer programs that execute in conjunction with the execution of an operating system, those skilled in the art will recognize that the embodiments may also be implemented in combination with other program modules and/or hardware devices. As described herein, computer programs include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

The computer 402 shown in FIG. 4 includes a baseboard, or "motherboard," which is a printed circuit board to which a multitude of components or devices may be connected by way of a system bus or other electrical communication path. In one illustrative embodiment, a CPU 422 operates in conjunction with a chipset 452. The CPU 422 is a standard central processor that performs arithmetic and logical operations necessary for the operation of the computer. The server computer 402 may include a multitude of CPUs 422.

The chipset 452 includes a north bridge 424 and a south bridge 426. The north bridge 424 provides an interface between the CPU 422 and the remainder of the computer 402. The north bridge 424 also provides an interface to a random access memory ("RAM") used as the main memory 454 in the computer 402 and, possibly, to an on-board graphics adapter 430. The north bridge 424 may also include functionality for providing networking functionality through a gigabit Ethernet adapter 428. The gigabit Ethernet adapter 428 is capable of connecting the computer 402 to another computer via a network. Connections which may be made by the network adapter 428 may include LAN or WAN connections. LAN and WAN networking environments are commonplace in offices, enterprise-wide computer networks, intranets, and the internet. The north bridge 424 is connected to the south bridge 426.

The south bridge 426 is responsible for controlling many of the input/output functions of the computer 402. In particular, the south bridge 426 may provide one or more USB ports 432, a sound adapter 446, an Ethernet controller 460, and one or more GPIO pins 434. The south bridge 426 may also provide a bus for interfacing peripheral card devices such as a graphics adapter 462. In one embodiment, the bus comprises a PCI bus. The south bridge 426 may also provide a system management bus 464 for use in managing the various components of the computer 402. Additional details regarding the operation of the system management bus 464 and its connected components are provided below.

The south bridge 426 is also operative to provide one or more interfaces for connecting mass storage devices to the computer 402. For instance, according to an embodiment, the south bridge 426 includes a serial advanced technology attachment ("SATA") adapter for providing one or more SATA ports 436 and an ATA 100 adapter for providing one or more ATA 100 ports 444. The SATA ports 436 and the ATA 100 ports 444 may be, in turn, connected to one or more mass storage devices such as the SATA disk drive 438 storing an operating system 440 and application programs.

As known to those skilled in the art, an operating system 440 comprises a set of programs that control operations of a computer and allocation of resources. An application program is software that runs on top of the operating system software, or other runtime environment, and uses computer resources to perform application specific tasks desired by the user. According to one embodiment of the invention, the operating system 440 comprises the LINUX operating system. According to another embodiment of the invention the operating system 440 comprises an operating system within the WINDOWS family of operating systems from MICROSOFT CORPORATION. According to another embodiment, the operating system 440 comprises the UNIX, LINUX, or SOLARIS operating system. It should be appreciated that other operating systems may also be utilized.

The mass storage devices connected to the south bridge 426, and their associated computer storage media, provide non-volatile storage for the computer 402. Although the description of computer storage media contained herein refers to a mass storage device, such as a hard disk or CD-ROM drive, it should be appreciated by those skilled in the art that computer storage media can be any available media that can be accessed by the computer 402.

By way of example, and not limitation, computer storage media may comprise volatile and non-volatile, removable and non-removable media implemented in any method or technology for storage of information such as computer-readable instructions, data structures, program modules or other data. Computer storage media also includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

According to embodiments, a low pin count ("LPC") interface may also be provided by the south bridge 426 for connecting a "Super I/O" device 470. The Super I/O device 470 is responsible for providing a number of input/output ports, including a keyboard port, a mouse port, a serial interface 472, a parallel port, and other types of input/output ports. The LPC interface may also connect a computer storage media such as a ROM or a flash memory such as a NVRAM 448 for storing the firmware 450 that includes program code containing the basic routines that help to start up the computer 402 and to transfer information between elements within the computer 402.

As described briefly above, the south bridge 426 may include a system management bus 464. The system management bus 464 may include a BMC 466. The BMC 466 may be the service processor 102. In general, the BMC 466 is a microcontroller that monitors operation of the computer system 402. In a more specific embodiment, the BMC 466 monitors health-related aspects associated with the computer system 402, such as, but not limited to, the temperature of one or more components of the computer system 402, speed of rotational components (e.g., spindle motor, CPU Fan, etc.) within the system, the voltage across or applied to one or more components within the system 402, and the available or used capacity of memory devices within the system 402. To accomplish these monitoring functions, the BMC 466 is communicatively connected to one or more components by way of the management bus 464. In an embodiment, these components include sensor devices 468 for measuring various operating and performance-related parameters within the computer system 402. The sensor devices 468 may be either hardware or software based components configured or programmed to measure or detect one or more of the various operating and performance-related parameters.

It should also be appreciated that the computer 402 may comprise other types of computing devices, including hand-held computers, embedded computer systems, personal digital assistants, and other types of computing devices known to those skilled in the art. It is also contemplated that the computer 402 may not include all of the components shown in FIG. 4, may include other components that are not explicitly shown in FIG. 4, or may utilize an architecture completely different than that shown in FIG. 4.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of operating a service processor, comprising:
receiving a keyboard, video and mouse console (KVM) flow from a host;
redirecting the KVM console flow to a first destination console;
redirecting a video stream, without a keyboard stream and a mouse stream, of the KVM console flow to a second destination console;
detecting that the first destination console is disconnected from the service processor;
invoking a privilege-checking event at the host through a first input to the host such that a security interface requesting credentials indicating a user privilege associated with the second destination console is generated at the host and displayed at the second destination console through the video stream;
redirecting the keyboard stream and the mouse stream to the second destination console;
receiving a second input in at least one of the keyboard stream and the mouse stream from the second destination console, wherein the second input contains the credentials;
redirecting the second input to the host; and
determining whether the second destination console is associated with a user privilege different from a user privilege associated with the first destination console, wherein the invoking the privilege-checking event is performed when the user privilege associated with the second destination console is different from the user privilege associated with the first destination console.

2. The method of claim 1, wherein the video stream is destined to a display controller, the keyboard stream is destined to a keyboard, and the mouse stream is destined to a pointing device.

3. The method of claim 1, wherein the invoking the privilege-checking event comprises sending, to the host, the first input, wherein the first input is further configured to trigger the host to generate a lock screen.

4. An apparatus, the apparatus being a service processor, comprising:
a memory; and
at least one processor coupled to the memory and configured to:
receive a keyboard, video and mouse console (KVM) flow from a host;
redirect the KVM console flow to a first destination console;
redirect a video stream, without a keyboard stream and a mouse stream, of the KVM console flow to a second destination console;
detect that the first destination console is disconnected from the service processor;
invoke a privilege-checking event at the host through a first input to the host such that a security interface requesting credentials indicating a user privilege associated with the second destination console is generated at the host and displayed at the second destination console through the video stream;
redirect the keyboard stream and the mouse stream to the second destination console;
receive a second input in at least one of the keyboard stream and the mouse stream from the second destination console, wherein the second input contains the credentials;
redirect the second input to the host; and
determine whether the second destination console is associated with a user privilege different from a user privilege associated with the first destination console, wherein the invoking the privilege-checking event is performed when the user privilege associated with the second destination console is different from the user privilege associated with the first destination console.

5. The apparatus of claim 4, wherein the video stream is destined to a display controller, the keyboard stream is destined to a keyboard, and the mouse stream is destined to a pointing device.

6. The apparatus of claim 4, wherein to invoke the privilege-checking event, the at least one processor is further configured to send, to the host, the first input, wherein the first input is further configured to trigger the host to generate a lock screen.

7. A non-transitory computer-readable medium storing computer executable code for operating a service processor, comprising code to:
receive a keyboard, video and mouse console (KVM) flow from a host;
redirect the KVM console flow to a first destination console;
redirect a video stream, without a keyboard stream and a mouse stream, of the KVM console flow to a second destination console;
detect that the first destination console is disconnected from the service processor;
invoke a privilege-checking event at the host through a first input to the host such that a security interface requesting credentials indicating a user privilege associated with the second destination console is generated at the host and displayed at the second destination console through the video stream;
redirect the keyboard stream and the mouse stream to the second destination console;
receive a second input in at least one of the keyboard stream and the mouse stream from the second destination console, wherein the second input contains the credentials;
redirect the second input to the host; and determine whether the second destination console is associated with a user privilege different from a user privilege associated with the first destination console, wherein the invoking the privilege-checking event is performed when the user privilege associated with the second destination console is different from the user privilege associated with the first destination console.

8. The non-transitory computer-readable medium of claim 7, wherein the video stream is destined to a display controller, the keyboard stream is destined to a keyboard, and the mouse stream is destined to a pointing device.

9. The non-transitory computer-readable medium of claim 7, wherein to invoke the privilege-checking event, the code is further configured to send, to the host, the first input, wherein the first input is further configured to trigger the host to generate a lock screen.

* * * * *